United States Patent [19]
Pfeil et al.

[11] Patent Number: 5,708,058
[45] Date of Patent: Jan. 13, 1998

[54] AQUEOUS COATING COMPOSITION BASED ON LOW-SOLVENT MODIFIED EPOXY RESIN DISPERSIONS

[75] Inventors: Armin Pfeil, Kaufering; Bernhard Stengel-Rutkowski, Wiesbaden; Claus Godau, Kiedrich, all of Germany

[73] Assignee: Vianova Resins GmbH, Mainz-Kastel, Germany

[21] Appl. No.: 719,647

[22] Filed: Sep. 25, 1996

[30] Foreign Application Priority Data

Sep. 29, 1995 [DE] Germany ............... 195 36 380.9

[51] Int. Cl.⁶ .................................. C08K 3/20
[52] U.S. Cl. ................... 523/403; 523/427; 428/413
[58] Field of Search ..................... 523/403, 427; 428/413

[56] References Cited

U.S. PATENT DOCUMENTS

| | | | |
|---|---|---|---|
| 3,870,666 | 3/1975 | Becker | 260/21 |
| 4,197,389 | 4/1980 | Becker et al. | 528/103 |
| 4,423,201 | 12/1983 | Hicks | 528/76 |
| 4,446,256 | 5/1984 | Hicks | 523/402 |
| 4,886,845 | 12/1989 | Becker et al. | 523/403 |
| 5,236,974 | 8/1993 | Dreischhoff et al. | 523/403 |
| 5,274,012 | 12/1993 | Neffgen et al. | 523/415 |

FOREIGN PATENT DOCUMENTS

| | | |
|---|---|---|
| 0 109 173 | 5/1984 | European Pat. Off. . |
| 0 497 404 | 8/1992 | European Pat. Off. . |
| 43 27 493 | 2/1995 | Germany . |
| 91/10695 | 7/1991 | WIPO . |

*Primary Examiner*—Melvyn I. Marquis
*Attorney, Agent, or Firm*—Foley & Lardner

[57] ABSTRACT

Aqueous low-solvent coating compositions comprising a modified epoxy resin dispersion comprising an epoxy resin which is prepared by condensation of one or more epoxide compounds having at least two epoxide groups per molecule with an aromatic polyol; a dispersant comprising a condensation product of an aliphatic polyol and an epoxide compound having at least two epoxide groups per molecule; a diluent consisting of ethylenically unsaturated otherwise inert or, if desired, functional monomers capable of free-radical polymerization or copolymerization, and water, and also an aqueous curing agent for the modified epoxy resin (I), which is suitable for curing at room temperature or at elevated temperatures (forced drying), components (I) and (II) being employed in proportions by mass such that the ratio of the number of epoxide groups which are capable of reaction to the number of amine hydrogen atoms is between 1:0.75 and 1:2. The coating compositions can be employed to produce matt coatings and in adhesives.

27 Claims, No Drawings

AQUEOUS COATING COMPOSITION BASED ON LOW-SOLVENT MODIFIED EPOXY RESIN DISPERSIONS

BACKGROUND OF THE INVENTION

DE-A 36 43 751 discloses aqueous epoxy resin dispersions which are prepared in the presence of a condensation product of an aliphatic polyol and an epoxy compound as emulsifier. However, these aqueous dispersions contain not only water but always a certain quantity of organic solvents. DE-A 41 28 487 describes how this quantity of organic solvent can be further reduced while at the same time improving the properties of these dispersions. This is done by no longer condensing the base resin in the presence of the emulsifier and by using flexibilizing polyepoxides as raw materials for the epoxy resin. In the examples of DE-A 41 28 487, polypropylene glycol diglycidyl ether is employed.

These dispersions have a markedly reduced organic solvent content with improved performance properties. In the context of the ever-increasing desire to minimize volatile organic components in aqueous coating compositions, however, even the reduced solvent content is found to present problems. Moreover, in order to flexibilize the base resin it is necessary to employ expensive raw materials which, in addition, may have adverse effects on the profile of properties.

Cold-curing systems in particular, for example, those for corrosion prevention and for protecting buildings, or those which are subjected to forced drying, are looked at particularly critically from the standpoint of solvent emission, since with these systems it is not possible, as with stoving systems, to burn off the solvent subsequently.

A substantial improvement of the existing systems, therefore, would be a binder based on a completely organic solvent-free dispersion, which can be employed for the sector of cold-curing coatings.

A particular problem is posed by the production of matt coatings (i.e. those with a degree of gloss of below 10%), which are employed in particular for heavy-duty wear applications (e.g., floors, subject to the passage of vehicles and persons), conditions under which glossy coatings acquire an unattractive surface. The matting is generally achieved by the use of pigments and fillers of high specific surface area (e.g., highly disperse silica), which in turn have a high binder requirement. In aqueous systems this severely impairs the rheology, and bodying occurs. It is therefore not possible to produce self-leveling matt coatings on the basis of epoxy systems without solvent.

One solution to this is to apply a very thin, self-leveling layer of a solvent-containing matted system to a solvent-free, nonmatted coating. As a result the entire coating appears matt from the start; in the course of wear, the lower layer also becomes matt, and to the eye the surface appears to be uniformly matted throughout. A disadvantage here is the use of solvent-containing systems with a coating process which per se is solvent-free. A typical conventional matt coating material is composed roughly of the following mass fractions: 30% matting agent, 35% binder and 45% organic solvent (xylene, petroleum ether, butyl acetate, glycol acetates, etc.). With a dry film thickness of about 40 μm, therefore, almost 50 g of solvent are released per square meter.

Since it has hitherto been impossible to produce self-leveling matt coatings from solvent-free epoxy systems and matting agents without the use of solvents, the development is desirable of an absolutely solvent-free binder which does not involve the use of external matting agents and therefore does not have the abovementioned rheological problems, while at the same time having a constant degree of gloss below 10% over the entire layer thickness, where possible.

It is therefore one object of the present invention to provide an improved aqueous, low-solvent coating composition.

A further object of the invention is to provide a process for producing the improved coating compositions according to the invention.

Another object of the invention resides in providing improved adhesives and matt coating compositions.

The invention accordingly provides aqueous, low-solvent coating compositions comprising the following components:

(I) A modified epoxy resin dispersion comprising (A) an epoxy resin which is a condensation product of mass fractions of the following starting materials (A-1) from 50 to 95%, preferably from 55 to 85%, of one or more epoxide compounds having at least two epoxide groups per molecule and preferably an epoxide group content of from 300 to 12,000 mmol/kg (epoxide equivalent weight=molar mass divided by the number of epoxide groups per molecule of from 90 to 3000 g/mol)

(A-2) from 5 to 50%, preferably from 15 to 45%, of an aromatic polyol and, optionally, (A-3) from 0 to 25%, preferably from 1 to 10%, of modifying compounds having at least two epoxide-reactive groups, (B) a dispersant comprising (B-1) a condensation product of an aliphatic polyol (B-11) having a weight-average molar mass $M_w$ of from 200 to 20,000 g/mol and an epoxy compound (B-12) having at least two epoxide groups per molecule and preferably an epoxide group content of from 300 to 12,000 mmol/kg, particularly preferably from 500 to 10,000 mmol/kg (epoxide equivalent weight of from 90 to 3000 and, respectively, from 100 to 2000 g/mol), the ratio of the number of OH groups in (B-11) to that of the epoxide groups in (B-12) being from 1:0.5 to 1:3.5 and the epoxide group content of this condensation product being between 2.5 and 200 mmol/kg (epoxide equivalent weight from 5000 to 400,000 g/mol), and (B-2) optionally, further, preferably nonionic surfactants, (C) a diluent comprising (C-1) ethylenically unsaturated, otherwise inert or, if desired, functional monomers capable of free-radical polymerization or copolymerization, and (C-2) if desired, low molar mass liquid epoxy-functional compounds, and (D) water and, if desired, organic solvents, (II) an aqueous curing agent for the modified epoxy resin (I), which is suitable for curing at room temperature or at elevated temperatures (forced drying), and, optionally (III) customary additives and catalysts.

Components (I) and (II) are employed in mass fractions such that the ratio of the number of epoxide groups which are capable of reaction to the number of amine hydrogen atoms is between 1:0.75 and 1:2.0.

The invention additionally provides a process for preparing the aqueous modified epoxy resin dispersion (I), which comprises first of all preparing the epoxy resin (A) by condensation of components (A-1), (A-2) and, if used, (A-3) at elevated temperatures in the presence of condensation catalysts, then adding at least a portion of the diluent (C) at a lower temperature and, if desired, carrying out partial reaction of the monomers (C-1) with the epoxy resin (A), subsequently incorporating the dispersant (B) by homogenization and obtaining an aqueous dispersion by portion wise addition of water (D), after which the monomers (C-1) are converted completely into a polymer dispersion with the aid of an appropriate initiator system and, if desired, with the addition of the remaining diluent (C) at appropriate temperatures. The portions of the diluent which are used if desired may vary in their composition as regards the quantity and nature of the constituents (C-1) and (C-2).

The novel binder is prepared by blending this epoxy-acrylate dispersion with a suitable curing agent (II), followed if appropriate by additives according to (III) which are known to the person skilled in the art.

Further objects, features and advantages of the present invention will become apparent from the detailed description of preferred embodiments that follows.

DETAILED DESCRIPTION OF THE PREFERRED EMBODIMENTS

It is known that epoxy-acrylic systems are able to exhibit advantageous properties not achievable with the individual components, these properties being a result of the advantageous properties of the individual components. Thus the epoxy component provides good adhesion, flexibility, chemical resistance and toughness, while the acrylic component, depending on the selection of the monomers, provides a fine-tunable glass transition temperature, hardness and mechanical resistance.

The term "acrylic component" here refers to copolymers obtained by (co)polymerization of $\alpha,\beta$-unsaturated monomers, which are referred to below as "acrylic monomers" or "acrylates". Examples are esters, amides and nitriles of acrylic and methacrylic acid, copolymerizable vinyl compounds such as vinyl acetate, vinyl ethers and vinyl halides, and also maleic, itaconic and fumaric acid derivatives.

DE-A 43 27 493 describes a method for preparing aqueous, low-solvent or even absolutely solvent-free, non-ionically stabilized epoxy resin dispersions on the basis of dispersions as described in DE-A 41 28 487, after modification with "acrylates". The application describes their specific use in combination with appropriate curing agents as a 1-component system for hot curing, especially for the internal coating of preserve cans, but not the use of the curing agent-free dispersions as a component of cold-curing 2-component coating compositions.

It has surprisingly now been found that it is possible by this method to prepare extremely low-solvent or even solvent-free epoxy resin dispersions which are highly suitable for room temperature curing or forced drying and which, in addition and given an appropriate choice of acrylic monomers, give rise to particularly outstanding matt coating systems completely without matting agent.

The 1,2-epoxide compounds corresponding to (A-1) and (B-12) are polyepoxides having on average at least two epoxide groups per molecule. These epoxide compounds can be either saturated or unsaturated and can be aliphatic, cycloaliphatic, aromatic and/or heterocyclic, and can also have hydroxyl groups and polyether units. They may additionally comprise those substituents and/or functional groups which do not give rise to any disruptive side reactions under the conditions of mixing or reaction, examples being alkyl or aryl substituents and ether groups.

The epoxide compounds are preferably polyglycidyl ethers based on polyhydric, preferably dihydric, alcohols, phenols, hydrogenation products of these phenols, and/or novolaks (reaction products of mono- or polyhydric phenols with aldehydes, especially formaldehyde, in the presence of acidic catalysts). The epoxide group contents of these epoxide compounds are preferably between 300 and 12,000 mmol/kg, preferably between 500 and 10,000 mmol/kg, in particular between 2800 and 10,000 mmol/kg (epoxide equivalent weights of between 90 and 3000 g/mol, preferably between 100 and 2000 g/mol, in particular between 100 and 350 g/mol).

Examples of polyhydric phenols are resorcinol, hydroquinone, 2,2-bis(4-hydroxyphenyl)propane (bisphenol A), dihydroxydiphenylmethane (bisphenol F, isomer mixtures if desired), tetrabromobisphenol A, 4,4'-dihydroxydiphenylcyclohexane, 2,2-bis(4-hydroxy-3-methylphenyl)propane, 4,4'-dihydroxybiphenyl, 4,4'-dihydroxybenzophenone, 1,1-bis(4-hydroxyphenyl)ethane, 2,2-bis[4-(2-hydroxypropoxy)phenyl]propane, 1,1-bis(4-hydroxyphenyl)isobutane, 2,2-bis(4-hydroxy-3-tert-butylphenyl)propane, bis(2-hydroxynaphthyl)methane, 1,5-dihydroxynaphthalene, tris(4-hydroxyphenyl)methane, bis (4-hydroxyphenyl) ether, bis(4-hydroxyphenyl) sulfone and the halogenation and hydrogenation products of the above-mentioned compounds. Bisphenol A is particularly preferred in this context.

Examples of polyhydric alcohols which may be mentioned are ethylene glycol, diethylene glycol, triethylene glycol, polyethylene glycols (n=4 to 35), 1,2-propylene glycol, polypropylene glycols (n=2 to 15), 1,3-propylene glycol, 1,4-butanediol, 1,5-pentanediol, 1,6-hexanediol, 1,2, 6-hexanetriol, glycerol, neopentyl glycol, 1,4-dimethylolcyclohexane, trimethylolethane, trimethylolpropane, and also block copolymers of ethylene oxide, propylene oxide, etc. with hydroxyl end groups, and also ethoxylated and propoxylated bisphenols such as, for example, propoxylated bisphenol A. Polyethylene glycols and polypropylene glycols (n=8 to 10) are particularly preferred in this context.

Polyglycidyl esters of polycarboxylic acids can also be used, and are obtained by reacting epichlorohydrin or similar epoxy compounds with an aliphatic, cycloaliphatic or aromatic polycarboxylic acid, such as oxalic acid, succinic acid, adipic acid, glutaric acid, phthalic acid, terephthalic acid, hexahydrophthalic acid, 2,6-naphthalenedicarboxylic acid and dimerized fatty acids such as linolenic acid, or else with acidic polyesters. Examples are diglycidyl adipate, diglycidyl phthalate and diglycidyl hexahydrophthalate.

A detailed list of suitable epoxy compounds can be found in the handbook "Epoxidverbindungen und Epoxidharze" [Epoxide compounds and epoxy resins] by A. M. Paquin, Springer Verlag, Berlin 1958, chapter IV and in Lee, Neville, "Handbook of Epoxy Resins", McGraw-Hill Book Co., 1967, chapter 2. The epoxide compounds mentioned can be employed individually or in a mixture.

Suitable aromatic polyols corresponding to (A-2) are preferably the aromatic compounds containing OH groups which were described above for components (A-1)/(B-12), i.e., polyhydric, preferably dihydric phenols, their halogenation products and/or novolaks. In this case too, bisphenol A is particularly preferred.

The modifying compounds according to (A-3) are compounds having at least two functional groups which are able to react with the epoxide groups of component (A-1), which compounds cannot be classified under the aromatic polyols according to (A-2). They can be used to bring about targeted modification of desirable properties in the base resin (A). The compounds used in this context can be polyamines (e.g., ethylenediamine, diethylenetriamine, triethylenetetramine, tetraethylenepentamine), polyoxyalkylenes with terminal amino groups (e.g., Jeffamine® and Novamin®), polycarboxylic acids (e.g., maleic acid, fumaric acid, phthalic acid, succinic acid, dimeric and trimeric fatty acids, etc., and their anhydrides, where available) and aliphatic polyols (e.g., ethylene glycol, propylene glycol, butylene glycol, polyethylene glycol, polypropylene glycol, trimethylolpropane and trimethylolethane, neopentyl glycol, glycerol). Particular preference is given to dimeric fatty acids having from 20 to 50 carbon atoms and to Jeffamine®.

The polyols (B-11) for preparing component (B-1) are preferably polyetherpolyols (polyoxyalkylene glycols) having weight-average molar masses ($M_W$; gel permeation chromatography; polystyrene standard) of preferably between 600 and 12,000 g/mol, in particular from 2000 to 8000 g/mol, and OH numbers which are expediently from 10 to 600 mg/g, preferably from 15 to 120 mg/g. These polyetherpolyols preferably possess only terminal, primary OH groups. Examples of these are block copolymers of ethylene oxide and propylene oxide with hydroxyl end groups and also polyethylene, polypropylene and polybutylene glycols, with the use of mixtures of the respective polyoxyalkylene glycols also being possible. Polyoxyethylene glycols are used preferably.

In addition to the novel dispersant (B-1) it is also possible to use other dispersants (B-2) of anionic, cationic and preferably nonionic type. Suitable anionic surfactants are alkylbenzenesulfonates, primary and secondary alkanesulfonates, α-olefinsulfonates, alkyl sulfates and alkyl ether sulfates, while suitable cationic surfactants are quaternary ammonium compounds, and the ionic groups must not interact with the epoxide groups. However, it is preferred to use nonionic surfactants such as ethoxylated or eth/propoxylated alcohols, oxo alcohols, alkylphenols (e.g. Arcopal® from Hoechst AG), castor oils, esters, glycerol stearates, fatty acids, fatty amines, fatty alcohols, but also, for example, ethylene oxide-propylene oxide block copolymers (e.g., Pluronic® from BASF). It is also possible to employ the emulsifiers specifically described for the dispersion of epoxy resins, such as, for example, those known from U.S. Pat. No. 4,423,201 and U.S. Pat. No. 4,446,256 (products of polyoxyalkylene glycols, diisocyanates and bisphenols), EP-A 0 497 404 (products of alkoxypolyalkylene glycols, anhydrides and alkylene oxides, epoxy alcohols or diglycidyl ethers), WO 91/10695 (products of polyglycidyl ethers, bifunctional compounds and alkoxypolyalkylene glycols), EP-A 0 109 173 (products of polyoxyalkylenepolyamines and epoxy resins) and DE-A 41 36 943 (products of polyalkylene glycols with diisocyanates and polyepoxides).

Suitable monomers according to (C-1) are all ethylenically unsaturated compounds which are capable of free-radical polymerization in aqueous emulsion and which do not interact undesirably at room temperature with the epoxy resin dispersion which is present. These include acrylic, methacrylic and higher alkacrylic acids and their alkyl esters ($C_1$- to $C_{18}$-alkyl (meth) acrylates, for example methyl acrylate and methyl methacrylate, ethyl acrylate and methacrylate, n- and isopropyl acrylate and methacrylate, n-, iso- and tert-butyl acrylate, n- and tert-butyl methacrylate, 2-ethylhexyl acrylate and methacrylate, 4-tert-butylcyclohexyl acrylate, isobornyl acrylate and methacrylate) and derivatives (e.g. acrylonitrile), but also vinyl derivatives (e.g. styrene, α-methylstyrene, vinyltoluenes, vinyl acetate, vinyl chloride, vinylidene chloride, N-vinylpyrrolidone) and α,β-unsaturated carboxylic acids such as maleic acid, fumaric acid, itaconic acid and their derivatives, and alkenes such as isoprene and butadiene. The monomers can also contain functional groups which participate in the curing reaction desired at a later time, and specific examples of compounds suitable in this context are glycidyl-functional monomers (e.g. glycidyl methacrylate, glycidyl acrylate). Finally, it is also possible for monomers to be present which are polyfunctional, either with respect to the polymerization or the curing, for instance, 1,6-hexanediol diacrylate and divinylbenzene.

Compounds to be mentioned as component (C-2), low molar mass liquid epoxy-functional compounds, are mono- and diglycidyl ethers, which are known, inter alia, by the term reactive diluents, for example, para-tert-butyl-phenyl glycidyl ether, n-butyl glycidyl ether, phenyl glycidyl ether, ortho-cresyl glycidyl ether, butanediol diglycidyl ether, hexanediol diglycidyl ether, neopentyl-glycol diglycidyl ether, dimethylolcyclohexane diglycidyl ether, 2-ethylhexyl glycidyl ether, higher alkyl glycidyl ethers etc. (e.g., the reactive diluents of the series Grilonit® RV from Ems Chemie, Epodil® from Anchor or Eurepox® RV from Schering), Versatic acid glycidyl esters (Cardura® E 10 from Shell), liquid polyoxyalkylene glycol diglycidyl ethers (e.g. Beckopox® EP 075 from Hoechst), and also liquid epoxy resins such as, for example, bisphenol A and F diglycidyl ethers. The component (C-2) is referred to below for reasons of simplicity as reactive diluent.

If desired, solvents (D) can also be added to the dispersion of epoxy-acrylic resin and dispersant. Particularly suitable organic solvents in this context are glycols, mono- and diethers and mono- and diesters of glycols with alcohols and acids, aliphatic alcohols having linear or branched alkyl radicals of 1 to 12 carbon atoms, cycloaliphatic and araliphatic alcohols and also esters and ketones, it being possible to employ these solvents individually or in a mixture. Examples are ethylene glycol, ethylene glycol monomethyl ether, ethylene glycol dimethyl ether, butylglycol (=ethylene glycol monobutyl ether), methoxypropanol, ethoxypropanol, ethanol, 1- and 2-propanol, butanol, cyclohexanol, benzyl alcohol, ethyl acetate, acetone and methyl isobutyl ketone, but also aromatic compounds such as toluene or xylene can be used. Preferred solvents are butylglycol, methoxypropanol, methoxybutanol, isopropoxypropanol, ethoxypropanol, 2-propanol and/or benzyl alcohol.

After the operation of dispersion has been completed, the emulsion polymerization is initiated in the epoxy resin dispersion at a temperature which ensures a rapid and complete reaction and simultaneously does not pose a threat to the dispersion. Suitable initiators for this purpose are those of the thermal type, or redox systems, all of which are well known to those skilled in the art. Thermal initiators are peroxides, hydroperoxides, peresters and diazo compounds, for example, dibenzoyl peroxide, acetyl peroxide, benzoyl hydroperoxide, tert-butyl hydroperoxide, di-tert-butyl peroxide, lauroyl peroxide, butyryl peroxide, diisopropylbenzene hydroperoxide, cumene hydroperoxide, paramenthane hydroperoxide, diacetyl peroxide, di-α-cumyl peroxide, dipropyl peroxide, diisopropyl peroxide, isopropyl tert-butyl peroxide, butyl tert-butyl peroxide, dilauroyl peroxide, difuroyl peroxide, ditriphenylmethyl peroxide, bis(p-methoxybenzoyl) peroxide, p-monomethoxybenzoyl peroxide, rubrene peroxide, ascaridol peroxide, tert-butyl peroxybenzoate, diethyl peroxyterephthalate, propyl hydroperoxide, isopropyl hydroperoxide, n-butyl hydroperoxide, cyclohexyl hydroperoxide, trans-decalin hydroperoxide, α-methylbenzyl hydroperoxide, α-methyl-α-ethylbenzyl hydroperoxide, tetralin hydroperoxide, triphenylmethyl hydroperoxide, diphenylmethyl hydroperoxide, 2,5-dimethyl-2,5-bis(2-ethylhexanoylperoxy)hexane and 1,1-bis(tert-butylperoxy)cyclohexane. Redox systems can be chosen from oxidizing agents, for example, hydrogen peroxide, tert-butyl hydroperoxide and persulfates, in combination with reducing agents such as alpha-hydroxy ketones, ascorbic acid, hydrazine and sulfites, bisulfites, metasulfites or hydrosulfites. The initiators preferably employed should generate few or no ionic compounds, so as not to increase unnecessarily the water-sensitivity of the films which are stoved subsequently. A particularly preferred system is tert-butyl hydroperoxide/ascorbic acid.

As hardeners (II) for the epoxy resins (I) of the invention it is possible to employ the curing agents or curing compounds (epoxy hardeners) which are known for this purpose, such as basic curing agents (amine hardeners), for example polyamines, Mannich bases, and adducts of amines with polymers, such as polyepoxides and polyamidoamines.

The curing of the novel epoxy resin dispersions (I) is also possible by means of so-called latent curing agents, i.e., compounds which develop their crosslinking action with respect to epoxide compounds only at elevated temperature, for example at from 60 to 250° C. Examples of such hardeners are urea, dicyandiamide, imidazole and imidazoline and also imidazolines and imidazoles which are substituted (for example with alkyl or alkoxy groups), guanidine, hydrazine and derivatives of these compounds. Also conceivable, however, are melamine resins or acidic curing agents, for example. Among these latent curing agents, dicyandiamide is preferably employed.

Examples of basic curing agents, preferably for the preferred curing at room temperature and/or lower temperatures (amine cold hardeners), which are generally employed in a ratio of the number of epoxide groups to the number of amine hydrogen atoms of from 1:0.75 to 1:2, are polyalkyleneamines, such as diethylenetriamine, triethylenetetramine, tetraethylenepentamine, pentaethylenehexamine, and also 2,2,4- and/or 2,4,4-trimethylhexamethylenediamine, bis(3-aminopropyl)amine, 1,4-bis-(3-aminopropyl)piperazine, N,N-bis(3-aminopropyl)ethylenediamine, neopentanediamine, 2-methyl-1,5-pentanediamine, 1,3-diaminopentane, hexamethylenediamine, etc., and also cycloaliphatic amines such as 1,2- and 1,3-diaminocyclohexane, 1,4-diamino-3,6-diethylcyclohexane, 1,2-diamino-4-ethylcyclohexane, 1-cyclohexyl-3,4-diaminocyclohexane, isophoronediamine and reaction products thereof, 4,4'-diaminodicyclohexylmethane and -propane, 2,2-bis(4-aminocyclohexyl)-methane and -propane, 3,3'-dimethyl-4,4'-diaminodicyclohexylmethane, 3-amino-1-cyclohexylaminopropane, 1,3- and 1,4-bis(aminomethyl) cyclohexane.

Araliphatic amines employed are in particular those where aliphatic amino groups are present, for example, meta- and para-xylylenediamine, and/or hydrogenation products thereof. The amines mentioned can be used alone or as mixtures.

Suitable Mannich bases are prepared by condensing polyamines, preferably diethylenetriamine, triethylenetetramine, isophoronediamine, 2,2,4- and 2,4,4-trimethylhexamethylenediamine, 1,3- and 1,4-bis (aminomethyl)cyclohexane, especially meta- and para-xylylenediamine, with aldehydes, preferably formaldehyde and mono- or polyhydric phenols having at least one ring position which is reactive with respect to aldehydes, examples being the various cresols and xylenols, para-tert-butylphenol, resorcinol, 4,4'-dihydroxydiphenylmethane and 2,2-bis-(4-hydroxyphenyl)propane, but preferably phenol.

Examples of suitable amine-epoxy adducts are reaction products of polyamines, for example, ethylenediamine, propylenediamine, hexamethylenediamine, 2,2,4-, 2,4,4-trimethylhexamethylenediamine, meta-xylylenediamine and/or bis(aminomethyl)cyclohexane with terminal mono- or polyepoxides, for example propylene oxide, hexene oxide, cyclohexene oxide, or with glycidyl ethers such as phenyl glycidyl ether, tert-butyl glycidyl ether, ethylhexyl glycidyl ether, butyl glycidyl ether or with glycidyl esters, such as the glycidyl ester of neopentanoic or neodecanoic acid (Cardura®E 10), or the polyglycidyl ethers and esters mentioned under (A-1).

Polyamidoamines, which can be used to cure the novel epoxy resin dispersions, are obtained, for example, by reacting polyamines with mono- or polycarboxylic acids, for example, dimerized fatty acids.

Preference is given to the use, as amine hardeners in addition to the abovementioned polyamines, of water-soluble polyoxyalkylene di- and poly-amines with molar masses of from 100 to 2000 g/mol, for example, the products marketed by Texaco under the trade name Jeffamine® and the readily water-dispersible curing agents as described in DE-B 23 32 177 and EP-B 0 000 605, i.e., modified amine adducts, for example.

In order to achieve more rapid and/or more extensive through-curing it is possible additionally to heat the coatings obtainable from the novel epoxy resin dispersions with the amine hardeners mentioned at from 50 to 120° C. for from 15 to 120 minutes (so-called forced drying).

Examples which may be mentioned here of conventional additives in the context of (III), which may possibly be present in the novel dispersions or binders, are the customary paint additives, such as pigments, pigment pastes, antioxidants, leveling agents and thickeners, antifoam/deaerating agents and/or wetting agents, reactive diluents, fillers, catalysts, preservatives, protective colloids. These additives, like the hardeners, may if desired be added to the dispersion not until just before processing.

For the preparation of the novel epoxy resin dispersions, the epoxy resin (A) is first prepared by condensation of components (A-1) and (A-2), together if used with (A-3), at elevated temperatures, in general at from 100 to 220° C., preferably at from 150 to 180° C., in the presence of a catalyst which accelerates the condensation.

Examples of suitable condensation catalysts are phosphines such as triphenylphosphine, phosphonium salts such as benzyltrimethylphosphonium chloride, for example, tertiary amines, such as N,N-dimethylbenzylamine, quaternary ammonium salts, such as tetramethylammonium chloride, alkali metal hydroxides, such as sodium hydroxide and lithium hydroxide, alkali metal carbonates, such as sodium carbonate and lithium carbonate, alkali metal salts of organic acids, such as sodium formate, lithium benzoate and lithium stearate, and Lewis acids, for example, boron trifluoride and its complexes, titanium tetrachloride, tin chloride and triethyloxonium tetrafluoroborate.

Where two or more epoxide compounds (A-1) are employed, the condensation reaction is preferably carried out in two stages, in which case in a first reaction one or more components (A-1) are reacted with the components according to (A-2) and, if used, (A-3) in a quantitative ratio such that this first condensation product has an epoxide group content of below 200 mmol/kg, preferably below 50 mmol/kg (epoxide equivalent weight of more than 5000 g/mol, preferably more than 20,000 g/mol) and contains phenolic groups which are still free, and in a further condensation reaction this first condensation product is reacted with further epoxide compounds according to (A-1), so that finally the desired epoxy resin (A) is obtained.

The dispersant (B-1) is prepared by condensation of the abovementioned polyetherpolyols (B-11) with the polyglycidyl ethers (B-12) in the presence of suitable catalysts at from 50 to 200° C., preferably at from 90 to 70° C., the ratio of the number of OH groups to that of the epoxide groups being from 1:0.5 to 1:8, preferably from 1:0.85 to 1:4, and the epoxide group content of the condensation product being between 2.5 and 8500 mmol/kg (epoxide equivalent weight from 120 g/mol to 400,000 g/mol).

Suitable catalysts for the preparation of the dispersant (B-1) are strong inorganic and organic bases such as, for example, alkali metal and alkaline earth metal hydroxides and oxides (e.g., lithium hydroxide, sodium hydroxide, potassium hydroxide, calcium hydroxide, barium hydroxide, magnesium oxide, calcium oxide), alkali metal alcoholates (e.g, sodium methylate, lithium methylate, sodium ethylate, potassium dodecylate, etc.) and the alkali metal salts of carboxylic acids (e.g., sodium and lithium stearate or lactate) and hydrides (e.g., alkali metal and alkaline earth metal hydrides and borohydrides, such as sodium hydride, calcium hydride and sodium borohydride). Also suitable are strong inorganic and organic protic acids (e.g., phosphoric acid, sulfuric acid, tetrafluoroboric acid and benzenesulfonic acid) and Lewis acids (e.g., tin(IV) chloride, titanium(IV) chloride, titanium(IV) isopropylate, triethyloxonium tetrafluoroborate and also boron trifluoride and its complexes, for example, with phosphoric acid, acetic acid (1:1 and 1:2), methanol, diethyl ether, tetrahydrofuran, phenol, ethylene glycol monoethyl ether, polyethylene glycol (molar mass 200 g/mol), dimethyl sulfoxide, di-n-butyl ether, di-n-hexyl ether, succinic acid and aliphatic, cycloaliphatic, araliphatic amines and also nitrogen heterocycles, etc.). However, certain inorganic salts are also highly suitable as catalysts, examples being alkali metal and alkaline earth metal fluorides, phosphates and stannates.

The catalysts preferably employed are the complexes of $BF_3$ with diethyl ether or acetic acid and aqueous tetrafluoroboric acid. The mass fraction of catalyst in the reaction mixture is generally from 0.1 to 5%, preferably from 0.1 to 1%. For easier metered addition, the catalyst may be diluted in a solvent such as diethyl ether, a glycol ether or cyclic ether, ketones and the like.

The dispersant is prepared by heating the mixtures to be reacted, comprising compounds containing hydroxyl groups and epoxide groups, up to the temperature at which condensation takes place at a sufficient rate, i.e., within 30 minutes to 5 hours. The reaction is advantageously monitored by the decrease in the epoxide group content. The reaction can be terminated by cooling to below the reaction temperature.

The condensation product thus obtained can be used in undiluted form as dispersant (B-1) for preparing the novel dispersions. Preferably however, for reasons of easier handling, a mixture is used as dispersant (B-1) which comprises mass fractions of from 20 to 99%, preferably from 40 to 60% of the condensation product, preferably in water or an aqueous medium which in turn consists of mass fractions of up to 100%, preferably up to 75%, of an organic solvent. Particularly suitable organic solvents are glycols, mono- and diethers and mono- and diesters of glycols with alcohols and acids, aliphatic alcohols with linear or branched alkyl radicals of 1 to 12 carbon atoms, cycloaliphatic and araliphatic alcohols, and also esters and ketones, in which case these solvents can be employed individually or as a mixture. Examples are ethylene glycol, ethylene glycol monomethyl ether, ethylene glycol dimethyl ether, butylglycol, methoxypropanol, ethoxypropanol, ethanol, 1- and 2-propanol, butanol, cyclohexanol, benzyl alcohol, ethyl acetate, acetone and methyl isobutyl ketone. Preference is given to the use of butylglycol, methoxypropanol, ethoxypropanol, 2-propanol, hydroxyethyl or hydroxypropyl methacrylate and/or benzyl alcohol, or to the monomers listed under (C-1).

The diluent (C) is added in its entirety all at once prior to dispersion, and thus serves to reduce the viscosity and to facilitate dispersion, or in the case of a relatively large quantity some of it can be present during the dispersion operation and the remainder is metered in after dispersion has taken place, for example, continuously during the emulsion polymerization. In this case the two portions need not be identical as to the nature and composition of components (C-1) and (C-2). This enables the specific production of so-called core-shell particles, whose chemical composition changes across the particle radius. The presence of the diluent during the dispersion has the advantage that it is not necessary to reduce the viscosity maximum in the course of phase inversion from water-in-oil (W/O) to oil-in-water (O/W) because of inert solvents which remain in the finished dispersion, as has been described in DE-A 41 28 487. It is thus possible successfully to formulate completely solvent-free dispersions—another considerable improvement over the prior art. An excessive diluent content during the dispersion operation, however, would reduce the viscosity to a value so low that it would no longer be possible to build up the shear force necessary for the dispersion processes. For this reason it may be necessary to divide the total amount into two expedient portions.

It is possible if desired to employ reactive diluents (C-2) if the desired degree of acrylization is not too high, since then the quantity of monomers (C-1) may be too low in order to fulfill the required function. Moreover, by way of the reactive diluents used it is possible to control the performance properties of the dispersion, for example, to reduce the minimum film-forming temperature (MFT), prolong the processing time (pot life), improve gloss, shear stability and stability to freeze-thaw cycles, etc. The advantage over the use of organic solvents is that these reactive diluents are incorporated in the film during the curing reaction and thus do not lead to the unwanted emission of organic components. The addition of the reactive diluent prior to the dispersion process has the advantage that this diluent is emulsified markedly better and with less effort than in the case of subsequent addition to the finished dispersion, thus leading to improved coating quality.

In order to prepare the modified dispersion, the epoxy resin (A) is admixed at temperatures from 60 to 200° C., preferably from 70 to 120° C., with the monomers (C-1)—possibly stabilized with appropriate inhibitors which are known to the person skilled in the art—and, if desired, with reactive diluents (C-2) and/or an expedient portion thereof, then the dispersants (B-1) and, if used, (B-2), followed if desired by organic solvents (D), and by stirring at from 15 to 180 minutes, preferably from 30 to 90 minutes. Alternatively it is possible after adding the monomers to carry out a reaction between epoxy resin and the monomers, for example, addition of carboxyl or amine monomers onto the epoxide groups or grafting onto aliphatic carbon atoms of the epoxide components (A) and (C-1) before adding the dispersant.

Subsequently, at temperatures from 30 to 100° C., preferably from 50 to 90° C., the appropriate quantity of water (D) is metered in with vigorous stirring, preferably in a plurality of portions, to produce the aqueous dispersion. In the course of this operation it is possible if desired to add appropriate antifoam/deaerating additives. Dispersion is advantageously carried out with the aid of suitable dispersing equipment, for example, a high-speed paddle stirrer, a pulsation-type spiral mixer, a colloid mill, a homogenizer, a dissolver or another rapid mixer with high shear force. This operation is described in great detail in DE-A 41 28 487, the disclosure of which is hereby incorporated by reference.

In the resulting, monomer-containing epoxy resin dispersion, which may also contain reactive diluent, the emulsion polymerization is then initiated at an appropriate temperature. The temperature must be sufficiently high for a rapid polymerization rate to be achieved; on the other hand, an excessive temperature must not be allowed to pose a threat to the stability of the dispersion. In the case of redox initiators, the oxidizing agent is preferably incorporated homogeneously together with the dilution water, and the reducing agent is metered in continuously: however, all conceivable variants are likewise to be considered to be in accordance with the invention. If the quantity of monomer is greater than required for dispersion, then the remaining quantity of monomers (c-1) are also metered in, enabling the specific preparation of core-shell acrylate particles, in order to exert the desired control over the properties of the dispersion. The preferred temperature range for the emulsion polymerization is from 60 to 90° C., with the reaction being monitored by determining the solids content or by gas chromatography. Any unwanted increase in viscosity can be compensated by metering in additional water.

The mass ratio of epoxy resin (A) to addition polymer (C-1) is from 99.5:0.5 to 20:80, preferably between 5:95 and 50:50. In this context, the polymer (C-1) may comprise glycidyl-containing monomers in a mass fraction of preferably from 2.5 to 25%. The proportion of reactive diluent (C-2) can be up to 25% based on polymers (A) and (C-1). The mass fraction of dispersant (B) is based on all nonwater-soluble constituents of the dispersion, i.e., on the epoxy resin (A), the polymer (C-1) and, if used, reactive diluent (C-2), and is between 1 and 25%, preferably between 2 and 15%. The composition of the dispersant in terms of (B-1):(B-2) is between 0:100 and 100:0, preferably more than 75:25. The solids content by mass of the novel dispersion is between 30 and 90%, but preferably from 55 to 75%, it being possible for the dispersion to have a mass fraction of up to 10% of solvent, although it is preferably solvent-free.

The epoxy resin in accordance with (A) of the novel dispersions preferably has an epoxide group content of from 250 to 2900 mmol/kg, in particular from 300 to 2500 g/mol (epoxide equivalent weight of from 350 to 4000, in particular from 400 to 3000, g/mol). The weight average particle size of the dispersed resin is in general not more than 1 μm and is preferably from 0.2 to 0.8 μm. The particle size of the polyacrylate (C-1) is below 0.5 μm, preferably below 0.25 μm. Even in the case of grafting the particle sizes of the novel dispersions are below 1 μm.

The viscosity of these dispersions is in general between 200 and 30,000 mPa's, preferably between 750 and 7000 mPa's.

The novel modified epoxy resin dispersions are notable on the one hand for their good storage stability, which can be attributed to the mean particle size being low for secondary dispersions, and additionally, in particular, for their very low or zero content of organic solvents and, in particular, by the substantially higher solids content. Compared with known epoxy resin dispersions or epoxy-acrylate dispersions, the coatings obtainable with the novel dispersions also possess a range of technical advantages, for example, low sensitivity to water, good elasticity coupled with very high hardness, good to very good adhesion to a wide variety of substrates, and outstanding anticorrosion effect when metallic materials are coated.

It has been found, additionally and surprisingly, that the films obtained with these dispersions, given an appropriate choice of monomers, are comprehensively matt. Degrees of gloss of below 10% are measured. For matt coatings based on the novel dispersions this provides the following advantages which it has hitherto been impossible to achieve with any other aqueous system: the matt coatings can be formulated without matting agents, so that there are no rheology problems, and the use of solvents is unnecessary. This makes it possible for the first time to produce entirely solvent-free, matt, self-leveling aqueous coatings. When the coating composition is abraded, the matt effect is retained unchanged, since the effect is constant within the film. With these systems, small additions of coalescence agents improve film formation without suppressing the matting effect.

The hardeners and further curable resins according to (II) are preferably not added until directly before the dispersion is employed.

Owing to their already mentioned outstanding technical properties, for example, in terms of adhesion, very high hardness, anticorrosion effect, water and chemical resistance, the novel dispersions are suitable—in combination with appropriate curing agents and additives—for the production of finish coatings, intermediate coatings, coating materials, molding compositions and curable compositions for a very wide variety of applications. For example, they can be used to produce protective and/or decorative coatings on a wide variety of substrates, especially rough and porous substrates, such as wood, mineral substrates (e.g., concrete and stone), glass, plastics (e.g., polyethylene, polypropylene, etc.), composite materials, ceramics and pretreated or nonpretreated metals, for example.

The novel dispersions are also outstandingly suited to one-layer coating. The adhering coat can remain unchanged as it is but can also be used as an intermediate coat, i.e., an undercoat for further coatings which may, in turn, consist of the same coating material or a different, conventional coating material.

With an appropriate choice of monomers (C-1) it is possible to produce matt clearcoats whose other properties are of unchanged high quality (good adhesion to a wide variety of substrates, very high hardness, good resistance properties, etc.). Owing to their ready dilutability and their favorable properties the novel dispersions are also suitable for additional use in electrodeposition coating. Another option is to use the novel dispersions to produce water-dilutable adhesives. They can also be employed as binders for textile, organic and/or inorganic materials. Furthermore, they may serve as an additive to polymer-modified cements.

Where the dispersions are used as coating compositions or as a predominantly aqueous coating material, application to the substrate is by conventional methods, for example brushing, spraying, dipping or rolling. Where no cold curing agents are added, the coatings are cured by heating at from 80 to 250° C. for a time which is sufficient for full curing, generally from 5 to 60 minutes.

Any additives according to (III) which are required, and also any further curing agents—should they be desired for the intended use—are added in quantities which are necessary for the corresponding purpose and are known to the person skilled in the art. In this case the choice of solids content and solvent content is open to the user.

The examples which follow describe the preparation of the epoxy resin (A), of the dispersant (B-1), of the dispersion (A)+(B)+(C) and of the binder (A)+(B)+(C)+(II) and also its use, with the examples being limited to the totally solvent-free systems which are particularly preferred.

EXAMPLES

I. Epoxy Resin (A)

A commercially available epoxy resin based on bisphenol A and epichlorohydrin having an epoxide group content of from 2120 to 2250 mmol/kg (mean epoxide equivalent weight of from 450 to 470 g/mol), e.g. Beckopox® EP 301 or Epikote® 1001

II. Dispersant (B-1)

309 g of technical-grade polyethylene glycol having a weight-average molar mass ($M_w$) of 4000 g/mol and 34.1 g of a polyglycidyl ether based on bisphenol A and having an epoxide group content of about 5640 mmol/kg (epoxide equivalent weight of 183 g/mol) were heated together to 100° C., and 0.35 ml of 50% strength aqueous tetrafluoroboric acid was added with stirring. The ratio of the number of OH groups to the number of epoxide groups was 1:1.20. The mixture was heated further to 130° C. and held at this temperature until the epoxide group content of the condensation product was about 2.9 mmol/kg (epoxide equivalent weight about 350,000 g/mmol). After cooling, the emulsifier had a brittle, wax-like firm consistency.

250 g of this condensation product were dissolved in 250 g of water with stirring and gentle heating to about 80° C. The clear, pale yellow emulsifier solution obtained had a viscosity (measured in accordance with Brookfield at 25° C.) of 3500 mPa's and a solids content by mass of 50%.

III. Epoxy-acrylate Dispersions (A)+(B)+(C)

Abbreviations

MMA Methyl methacrylate

BuGl Butylglycol

MOP Methoxypropanol

GlyMA Glycidyl methacrylate

BzOH Benzyl alcohol

General working procedure:

423 g of epoxy resin (A) are melted and homogenized at 100° C. with the monomers (C) in accordance with the table below, and the quantity indicated below of dispersant (B) is added at 90° C. From 50 to 90 g of water are stirred in rapidly at 80° C., the mixture is stirred until phase inversion takes place, and about 170 g of water are added in portions, the temperature at the end being 60° C. Tert-butyl hydroperoxide (1% of the mass of the monomers) is added and the mixture is homogenized at the aforesaid temperature for 30 minutes. The temperature is subsequently maintained at 60° C., 0.05 ml of $FeSO_4$ heptahydrate solution (2% in water) is added, and a solution of ascorbic acid (1.5% of the mass of the monomers) in about 45 g of water is metered in over the course of 1.5 hours, in the course of which a slight exothermic reaction is observed. After the mixture has been allowed to after-react at 60° C. for 1.5 h, it is diluted with a little water to a viscosity of about 2500 mPa's.

TABLE

| Example | Dispersant (%) | Monomers (%) | NVC (%) | EGC (mmol/kg) | EV solid (g/mol) | PS (nm) | Viscosity (mPa · s) |
|---|---|---|---|---|---|---|---|
| III.1 | 6.5 | 10 MMA | 67.6 | 1767 | 566 | 491 | 1100 |
| III.2 | 6.5 | 10 (9 MMA + 1 GlyMA) | 65.1 | 1859 | 538 | 783 | 2200 |
| III.3 | 7.0 | 10 MMA | 66.9 | 1789 | 559 | 448 | 1000 |
| III.4 | 7.0 | 10 (9 MMA + 1 GlyMA) | 65.8 | 1821 | 549 | 409 | 1100 |
| III.5 | 7.5 | 10 MMA | 65.9 | 1773 | 564 | 409 | 1800 |
| III.6 | 7.5 | 10 (9 MMA + 1 GlyMA) | 65.7 | 1828 | 547 | 398 | 1050 |
| III.7 | 6, + 5 BuGl | 10 MMA | 61.3 | 1799 | 556 | 425 | 1300 |
| C | .6, + 3 BzOH, + 7 MOP | none | 53.0 | 1905 | 525 | 500 | 1000 |

Abbreviations:

NVC nonvolatiles content; solids content (1 g, 1 h, 125° C.)

EGC epoxide group content

EV epoxide equivalent weight

PS particle size, photon correlation spectroscopy, monomodal

C comparison

IV. Preparation of the Novel Coating Compositions

General working procedure for the formulation of the novel binders:

50 g of dispersion are mixed with a curing agent according to EP-A 0 000 605 (Example 5c) which was diluted with water to 40% (content of active hydrogen atoms: 3125 mmol/kg, i.e. "H-active equivalent weight" 320 g/mol) in a stoichiometric ratio of 1:1 and the mixture is drawn as a clearcoat onto degreased glass plates (wet film thickness about 200 μm). Drying is carried out at room temperature.

V. Performance Properties

Explanation of the test conditions:

1. Dust-dry: glass beads scattered onto the film can no longer be removed with a brush after full curing.
2. Tack-free: the glass beads can be removed with a brush after full curing.
3. Pot life: after mixing hardener and dispersion, films with a wet thickness of 200 μm are drawn out every half an hour. The occurrence of cloudiness in the film after full curing indicates the end of the pot life and is recorded as the test result.
4. Hardness: Konig pendulum hardness, DIN 53 157.
5. Water resistance after 24 h, storage at room temperature: films with a wet thickness of 200 μm drawn out onto glass plates are stored in water for 24 h and then tested at room temperature. The evaluation scale is from 0=very good to 5=poor.

The test results are reported in the table below:

|  |  | Novel dispersions | | | | | | | Comparison |
|---|---|---|---|---|---|---|---|---|---|
| Dispersion |  | III.1 | III.2 | III.3 | III.4 | III.5 | III.6 | III.7 | C |
| Quantity of dispersions | g | 50 | 50 | 50 | 50 | 50 | 50 | 50 | 50 |
| Quantity of hardener 40% strength | g | 23.9 | 24.2 | 23.9 | 24.0 | 23.4 | 24.0 | 22 | 20.0 |
| Pot life | h:min | 0:30 | 0:30 | 0:45 | 0:45 | 0:35 | 0:30 | 0:30 | 3:00 |
| Dust-dry time | h:min | 0:15 | 0:25 | 0:20 | 0:35 | 0:25 | 0:20 | 0:25 | 0:20 |
| Tack-free drying time | h:min | 1:10 | 1:40 | 1:45 | 1:45 | 2:00 | 2:15 | 2:30 | 4:15 |
| Leveling | * | 0 | 0 | 0 | 0–1 | 0–1 | 0 | 1–2 | 0 |
| Film transparency | * | matt | matt | matt | matt | matt | matt | matt | clear |
| Surface tack | * | 0 | 0 | 0 | 0 | 0 | 0 | 0 | 0 |
| Pendulum hardness after 1 d | s | 151 | 156 | 147 | 154 | 131 | 146 | 115 | 54 |
| Pendulum hardness after 2 d | s | 175 | 179 | 179 | 184 | 170 | 171 | 145 | 75 |
| Pendulum hardness after 7 d | s | 190 | 191 | 192 | 187 | 180 | 177 | 167 | 118 |
| Water resistance after 24 h | * | 1 | 0–1 | 1 | 1–2 | 1 | 2 | 2 | 2 |
| Pendulum hardness after water storage | s | 86 | 97 | 86 | 104 | 148 | 93 | 91 | 46 |
| Pendulum hardness in the vapor space | s | 128 | 170 | 138 | 155 | 163 | 135 | 126 | 53 |
| Gloss after 1 h | % | 2.7 | 6.6 | 2.7 | 2.7 | 3.3 | 2.7 | 20 | 100 |

*Scale: 0 = excellent to 5 = poor

While the pot life is markedly reduced, very hard, matt films with degrees of gloss of <10% are obtained where no coalescence agent was added (see III.7). The water resistance tends to be better than in the case of the comparison, and at lower emulsifier contents.

Since matting is comprehensive (goes all the way through the film) and the films are very hard, the matt effect is retained even when the film is scratched and polished—in contrast to matt coating materials conventionally formulated with matting agents. This makes the novel coating materials outstandingly suitable for the production of highly abrasion-resistant and water-resistant coatings based on only one coat.

The entire disclosure of German Patent Application No. 195 36 380.9, filed on Sep. 29, 1995, is hereby incorporated by reference.

Although only a few exemplary embodiments of this invention have been described in detail above, those skilled in the art will readily appreciate that many modifications are possible in the exemplary embodiments without materially departing from the novel teachings and advantages of this invention. Accordinly, all such modifications are intended to be included within the scope of this invention.

What is claimed is:

1. An aqueous, low-solvent coating composition comprising:

(I) a modified epoxy resin dispersion comprising
  (A) an epoxy resin which is a condensation product of mass fractions of the following starting materials,
    (A-1) from 50 to 95% of one or more epoxide compounds having at least two epoxide groups per molecule
    (A-2) from 5 to 50% of an aromatic polyol;
  (B) a dispersant comprising
    (B-1) a condensation product of
      (B-11) an aliphatic polyol having a weight-average molar mass $M_W$ of from 200 to 20,000 g/mol, and
      (B-12) an epoxide compound having at least two epoxide groups per molecule;
  (C) a diluent comprising
    (C-1) ethylenically unsaturated, otherwise inert or, functional monomers capable of free-radical polymerization or copolymerization,
  (D) and water, and
(II) an aqueous curing agent for the modified epoxy resin (I), which is suitable for curing at room temperature or at elevated temperatures which curing agent is selected from the group consisting of polyamines, Mannich bases, epoxy-amine adducts with free amino groups, polyamidoamines, and latent curing agents, components (I) and (II) being employed in mass fractions such that the ratio of the number of epoxide groups which are capable of reaction to the number of amine hydrogen atoms is between 1:0.75 and 1:2.

2. An aqueous, low-solvent coating composition as claimed in claim 1, wherein the epoxy resin (A) is a condensation product of mass fractions of the following starting materials (A-1) from 55 to 85% of one or more epoxide compounds having at least two epoxide groups per molecule, and (A-2) from 15 to 45% of an aromatic polyol.

3. An aqueous, low-solvent coating composition as claimed in claim 1, wherein the mixture of starting materials used to prepare the epoxy resin (A) further comprises a mass fraction of (A-3) from 1 to 25% of a modifying compound having at least two epoxide-reactive groups.

4. An aqueous, low-solvent coating composition as claimed in claim 1, wherein in the starting materials for preparing the dispersant (B1) the ratio of the number of OH groups to that of the epoxide groups is from 1:0.5 to 1:3.5, and the epoxide group content of this condensation product (B1) is between 2.5 and 200 mmol/kg.

5. An aqueous, low-solvent coating composition as claimed in claim 1, wherein the dispersant (B) additionally comprises a nonionic surfactant (B2).

6. An aqueous, low-solvent coating composition as claimed in claim 1, wherein the diluent (C) additionally comprises a low molar mass liquid epoxide compound (C-2).

7. An aqueous, low-solvent coating composition as claimed in claim 1, wherein the dispersion comprises a mass fraction of up to 10% of an organic solvent.

8. An aqueous, low-solvent coating composition as claimed in claim 1, wherein the epoxide compounds according to (A-1) and (B-12) can be identical or different and are selected from the group consisting of polyglycidyl ethers of polyhydric alcohols, phenols, hydrogenated phenols and novolaks, and polyglycidyl esters of aliphatic, cycloaliphatic and aromatic polycarboxylic acids having 2 to 40 carbon atoms with an epoxide group content of between 300 and 12,000 mmol/kg.

9. An aqueous, low-solvent coating composition as claimed in claim 8, wherein the epoxide group content of (A-1) and (B-12), in each case independently of one another, is between 500 and 11,000 mmol/kg.

10. An aqueous, low-solvent coating composition as claimed in claim 8, wherein the epoxide group content of (A-1) and (B-12), in each case independently of one another, is between 2800 and 10,000 mmol/kg.

11. An aqueous, low-solvent coating composition as claimed in claim 1, wherein the aromatic polyol (A-2) is selected from the group consisting of dihydric and polyhydric mono- and polycyclic phenols, their halogenation products, and novolaks.

12. An aqueous, low-solvent coating composition as claimed in claim 3, wherein the modifying compound (A-3) is a substance other than aromatic polyols and has at least two functional groups which are reactive toward epoxide groups.

13. An aqueous, low-solvent coating composition as claimed in claim 3, wherein the modifying compound (A-3) is selected from the group consisting of aliphatic polyamines, polyoxyalkylene mono- and polyoxyalkylene di-amines, aliphatic and aromatic polycarboxylic acids having 2 to 60 carbon atoms, and aliphatic polyols.

14. An aqueous, low-solvent coating composition as claimed in claim 1, wherein the compound (B-11) selected from polyoxyalkylene polyglycols having a weight-average molar mass of from 600 to 1200 g/mol.

15. An aqueous, low-solvent coating composition as claimed in claim 1, wherein the compound (C-1) is selected from the group consisting of esters of $\alpha,\beta$-olefinically unsaturated carboxylic acids with aliphatic alcohols having 1 to 18 carbon atoms, aromatic vinyl compounds, vinyl esters and vinyl halides, $\alpha,\beta$-olefinically unsaturated carboxylic acids and their amides and nitriles.

16. An aqueous, low-solvent coating composition as claimed in claim 6, wherein the compound (C-2) is an ether of glycidyl alcohol and compounds selected from the group consisting of mono-and polyhydric phenols, alkyl-substituted phenols, and mono- and polyhydric branched and unbranched alcohols, and an ester of glycidyl alcohol with branched or unbranched aliphatic carboxylic acids having 2 to 40 carbon atoms.

17. An aqueous, low-solvent coating composition as claimed in claim 1, wherein the latent curing agent is selected from the group consisting of urea, dicyandiamide, imidazole, imidazoles, imidazolines, substituted imidazoles, substituted imidazolines, guanidine, acetoguanamine and benzoguanamine.

18. A process for preparing an aqueous, low-solvent coating composition, which comprises
   (I) a modified epoxy resin dispersion comprising
      (A) an epoxy resin which is a condensation product of mass fractions of the following starting materials:
         (A-1) from 50 to 95% of one or more epoxide compounds having at least two epoxide groups per molecule
         (A-2) from 5 to 50% of an aromatic polyol;
      (B) a dispersant comprising
         (B-1) a condensation product of
            (B-11) an aliphatic polyol having a weight-average molar mass $M_w$ of from 200 to 20,000 g/mol, and
            (B-12) an epoxide compound having at least two epoxide groups per molecule;
      (C) a diluent comprising
         (C-1) ethylenically unsaturated, otherwise inert or, functional monomers capable of free-radical polymerization or copolymerization,
      (D) and water, and
   (II) an aqueous curing agent for the modified epoxy resin (I), which is suitable for curing at room temperature or at elevated temperatures which curing agent is selected from the group consisting of polyamines, Mannich bases, epoxy-amine adducts with free amino groups, polyamidoamines, and latent curing agents,
   wherein said process comprising the following steps: first preparing the epoxy resin (A) by condensation of components (A-1) and (A-2) at an elevated temperature in the presence of a condensation catalyst, then adding at least a portion of the diluent (C) at a lower temperature and, optionally, carrying out a partial reaction of the monomers (C-1) with the epoxy resin (A), subsequently incorporating the dispersant (B) by homogenization and obtaining an aqueous dispersion by portionwise addition of water (D), after which the monomers (C-1) are polymerized with the aid of an initiator system and, optionally, with the addition of the remaining diluent (C), and adding the aqueous curing agent (II) before the modified epoxy resin dispersion (I) is used.

19. An aqueous, low-solvent coating composition prepared by the process of claim 18.

20. A coated article, comprising a substrate and a coating from a coating composition as claimed in claim 1.

21. A coated article as claimed in claim 20, wherein the coating comprises a matt clearcoat.

22. A coated article as claimed in claim 21, comprising a single layer matt clearcoat coating.

23. A water-dilutable adhesive comprising an aqueous dispersion as claimed in claim 1.

24. An aqueous coating composition as claimed in claim 1 which is substantially free of organic solvent.

25. A process according to claim 18, wherein the curing agent is in an aqueous system.

26. A process according to claim 18, wherein the curing agent is selected from the group consisting of polyamines, Mannich bases, epoxy-amine adducts with free amino groups, and polyamidoamines.

27. An aqueous, low-solvent coating composition according to claim 1, wherein the curing agent is selected from the group consisting of polyamines, Mannich bases, epoxy-amine adducts with free amino groups, and polyamidoamines.

* * * * *